(12) United States Patent
Denmark

(10) Patent No.: US 7,866,909 B2
(45) Date of Patent: Jan. 11, 2011

(54) CABLE LOCKING SYSTEM

(76) Inventor: Marvin Albert Denmark, P.O. Box 484, Noti, OR (US) 97461

( * ) Notice: Subject to any disclaimer, the term of this patent is extended or adjusted under 35 U.S.C. 154(b) by 0 days.

(21) Appl. No.: 12/013,369

(22) Filed: Jan. 11, 2008

(65) Prior Publication Data
US 2009/0179118 A1    Jul. 16, 2009

(51) Int. Cl.
*F16D 1/00*    (2006.01)
(52) U.S. Cl. ........................ 403/353; 248/56; 24/115 R; 24/115 G; 24/658; 24/128
(58) Field of Classification Search ................. 248/56; 403/353; 24/115 R, 115 G, 658, 128
See application file for complete search history.

(56) References Cited

U.S. PATENT DOCUMENTS

| | | | | |
|---|---|---|---|---|
| 1,344,452 A | * | 6/1920 | Roth | 362/408 |
| 1,483,274 A | * | 2/1924 | Bouschor | 403/353 |
| 2,260,048 A | * | 10/1941 | Newell | 411/552 |
| 3,825,227 A | | 7/1974 | Whitehill et al. | |
| 4,460,147 A | | 7/1984 | Macbain | |
| 4,956,758 A | * | 9/1990 | Aubrey et al. | 362/285 |
| 5,024,409 A | | 6/1991 | Bohnen | |
| 5,560,101 A | * | 10/1996 | Sandell et al. | 29/868 |
| 6,109,819 A | | 8/2000 | Welch | |
| 6,222,128 B1 | | 4/2001 | Gretz | |
| 6,386,489 B1 | | 5/2002 | Gretz | |
| 7,398,951 B1 | * | 7/2008 | Sugalski et al. | 248/311.2 |
| 2005/0111912 A1 | * | 5/2005 | Brain et al. | 403/353 |

* cited by examiner

*Primary Examiner*—Anita M King
*Assistant Examiner*—Nkeisha J Smith

(57) ABSTRACT

The cable locking system is a two-part device that locks a cable-like strap or other flexible or rigid member with an enlarged end into place by using an opposing arrangement of keyhole-shaped apertures bored into two rigid parts.

The cable locking system requires no extra hardware to secure the connection, and can be retrofitted to fit virtually any size support system in numerous applications.

The cable locking system can be installed quickly and easily without a need for tools, extra labor, or supporting equipment. In the case of a suspension bridge, the suspension parts can be pre-manufactured and assembled, then quickly and easily connected to complete the structure.

The cable locking system makes the construction of a suspension bridge or other hoisting device as well as many kinds of structures simple and straightforward, with fewer parts that can potentially fail. The cable locking system can also easily be disassembled.

4 Claims, 1 Drawing Sheet

CABLE LOCKING SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

This invention relates to a locking system that easily secures a cable-like strap or other flexible or rigid member with an enlarged end to a supporting structure by using an opposing arrangement of keyhole-shaped apertures. It is a simple, straightforward method that does not require bolting or other hardware-fastening methods to secure a connection. For the cable locking system background, a cable-like strap or flexible or rigid member will be referred to as a cable.

In current methods to secure cables to a structure, a cable end crimp-type fastener or other enlarged end is installed at the end of a cable after threading the cable through a hole in the supporting structure. Cable is also attached to hardware that is installed in a supporting structure. For instance, eye-bolts are driven into a supporting member and then a cable is attached and secured. Another method is a threaded end is crimped to the end of the cable and then installed into the supporting structure.

Current methods to secure cable to a supporting structure require hardware to lock the system into place. The disadvantages of these existing connection systems:

(a) They generally require elaborate on-site installation.
(b) The hardware used to assemble the system can eventually undermine or shorten the life of the strength and durability of the system, such as sheared hardware and broken welds.
(c) In the case of a suspension bridge, scaffold or other hanging support structure, erecting the system can require extra equipment such as scaffolding and booms.
(d) Extra labor can be necessary for assembly.

Using a keyhole aperture as a locking device has been used in other applications, however whether viewed individually or in combination with each other, these applications do not render the present invention obvious. No single patent reference found discloses all of the features of the present invention nor would it be obvious to construct the present invention based on prior art.

In U.S. Pat. No. 3,825,227, Whitehill et al. discloses a "Tensioning Device," which includes a plate with a keyhole wherein a shaft is secured within the smaller portion of the keyhole and an aperture of a retaining element. However reference does not illustrate all of the structure of the present invention. In particular, Whitehill et al. does not teach a box including a first keyhole and a plate with a second keyhole selectively positioned within. In addition, Whitehill et al. does not disclose a pair of keyholes extending in opposing directions, wherein the small portions of each of the keyholes collectively retain a cable.

In U.S. Pat. No. 5,024,409, Bohnen discloses a "Slidably Lockable Bracket" which has a keyhole aperture. A sliding member having a post and an enlarged head is engaged and locked by inserting the head through an enlarged aperture, sliding along the slot and dropping the head in the lower portion. However reference does not illustrate all of the structure of the present invention. In particular, Bohnen does not teach a box including a first keyhole and a plate with a second keyhole selectively positioned within. In addition, Bohnen does not disclose a pair of keyholes extending in opposing directions, wherein the small portions of each of the keyholes collectively retain a cable.

The U.S. Pat. No. 6,109,819 to Welch is another example of an invention that is related to the Cable Locking System, however structural differences still exist. It does not disclose a pair of keyholes extending in opposing directions.

BRIEF SUMMARY OF THE INVENTION

This invention is a two-part device that locks a cable-like strap or other flexible or rigid member with an enlarged end into place by using an opposing arrangement of keyhole-shaped apertures bored into two parts.

The cable locking system requires no extra hardware to secure the connection, and can be retrofitted to fit virtually any size support system in numerous applications such as a suspension bridge, scaffold, or hoisting device.

The cable locking system can be installed quickly and easily "on the fly" without a need for tools, extra labor, or supporting equipment such as scaffolding and booms. In the case of a suspension bridge, the parts can be pre-manufactured and assembled, then quickly and easily connected to complete the structure.

The cable locking system makes the construction of a suspension bridge or other hoisting device as well as many kinds of structures simple and straightforward, with fewer parts that can fail. The cable locking system can also easily be disassembled.

DETAILED DESCRIPTION OF THE INVENTION

Figure 1:
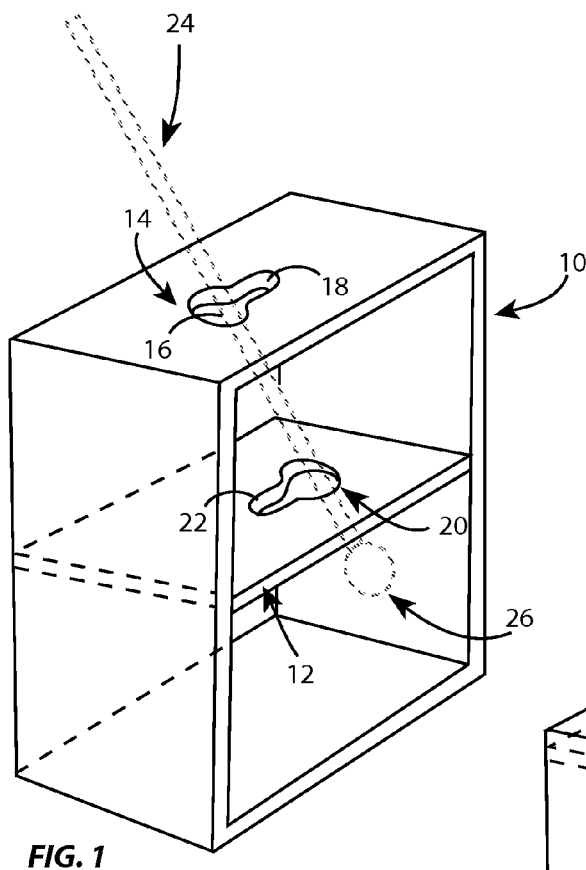
FIG. 1 is a perspective view of the parts of the present invention.

For the cable locking system description, a cable-like strap or other flexible or rigid member will be referred to as a cable. As shown in FIG. 1, components of the cable locking system consist of a rectangular or square band of rigid material 10 with a top, bottom and two sides, and a flat plate of rigid material 12. It should be noted that band 10 may be substituted with any number of alternative structures and band 10 is merely representative of one embodiment of various structures that can be used to create the cable locking system, in this case, a suspension bridge, scaffold or other hoisting device. It should also be noted that the flat plate of rigid material 12 may be substituted with any number of alternative structures and the flat plate of rigid material 12 is merely representative of one embodiment of various structures that can be used to create the cable locking system, in this case, a suspension bridge, scaffold or other hoisting device.

The flat plate is fashioned to fit snugly against the inside top of the rigid band. The thickness and dimension will be determined by the application of the cable locking system and the size of the cable 24 and the enlarged end 26 to be secured. Band 10 includes a keyhole-shaped aperture 14. The wide portion 16 of the keyhole-shaped aperture 14 is just large enough to accept entry of the enlarged end 26. The narrow portion 18 of the keyhole-shaped aperture 14 is just large enough to accept entry of the cable 24. The narrow portion 18 of the keyhole-shaped aperture ends centered over the center point of the top of band 10.

The rectangular or square flat plate of rigid material 12 includes a keyhole-shaped aperture 20 which is of the same dimensions as keyhole-shaped aperture 14. The narrow portion 22 of the keyhole-shaped aperture ends centered over the center point of the top of flat plate 12.

For assembly of the structure, the flat plate 12 is fit inside the band 10 and held at adequate distance so that the cable 24 with the enlarged end 26 can be passed through the large portion of both keyhole-shaped apertures 14 and 20 as shown in FIG. 1. The keyhole-shaped aperture 20 is facing in the opposite direction of the keyhole-shaped aperture 14 as shown in FIG. 1. Alternately, the keyhole-shaped aperture 20 can face in the same direction as the keyhole-shaped aperture 14. After the cable 24 with the enlarged end 26 is passed through the large portion of both keyhole-shaped apertures 14 and 20, the flat plate 12 would then be tilted so that it can be pivoted 180 degrees, so that the keyhole-shaped aperture 20 would be facing in the opposite direction of the keyhole-shaped aperture 14 as shown in FIG The flat plate 12 is then placed snug against the inside top of the band 10 with the cable 24 with the enlarged end 26 pulled up tight. The narrow portions 18 and 22 of the keyhole-shaped apertures are now lined up at the center points of band 10 and flat plate 12.

Figure 2:
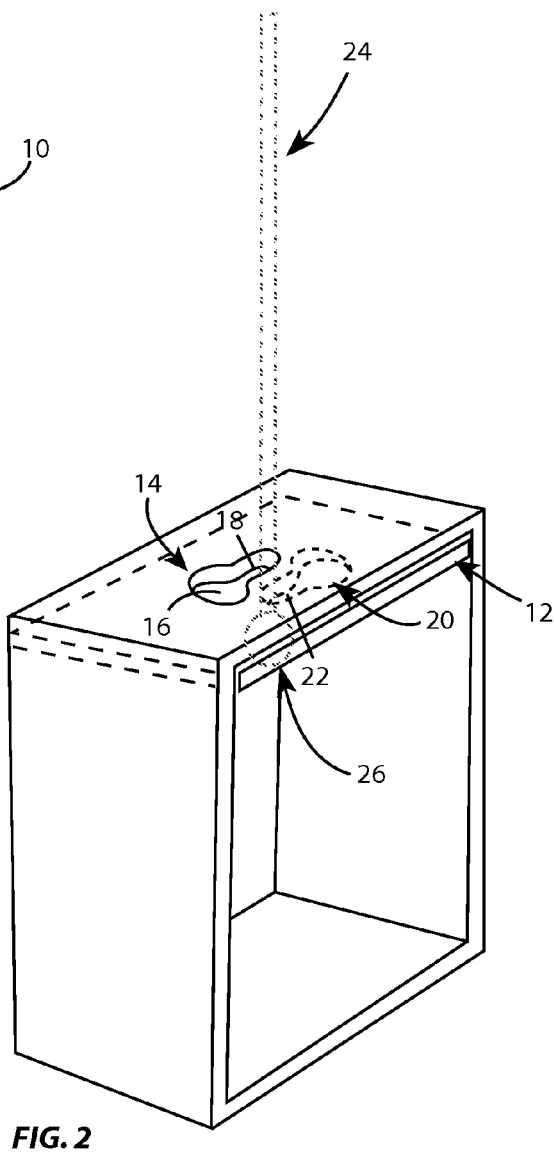
FIG. 2 is a perspective view of the present invention in the locked position.

This locks the cable 24 into place as shown in FIG. 2.

I claim:

1. A device for mounting, comprising a cable locking system having:
    a tensioned cable having a size, the cable having an enlarged round end, the cable and the enlarged round end having known diameters;
    a pair of members comprising a rigid band and a rigid flat plate;
        said rigid band having a rectangular shape with a top side, a bottom side, and two sides creating an opening;
        said rigid plate having a rectangular shape with a top side, bottom side and two sides, said plate movably fitting within said opening, and said two sides of said plate contacting said two sides of said band;
        said members each having an elongated keyhole aperture with a narrow portion at one end and an enlarged portion at an opposite end, said aperture of said band located on said top side of said band and oriented in an opposed relation with said aperture of said plate such that said narrow portion of said band is located directly above said narrow portion of said plate, said narrow portions being larger than said known diameter of said cable and smaller than said known diameter of said enlarged end, and said enlarged end of said cable is capable of being inserted through said enlarged portion of said apertures but not said narrow portions;
    whereby said members are held together and said cable is locked in place, such that, said cable is inserted through said narrow portions of said apertures of said members and whereby a load on said members, when said cable is tensioned, will cause said plate to move upward such that said top side of said plate abuts a bottom portion of said top side of said band, thereby locking said members together, and said cable is prevented from being moved into said enlarged portions and is held immovably locked in place.

2. The device for mounting of claim 1 wherein said cable with an enlarged end when tensioned will be securely locked until intentionally unloaded and disassembled.

3. The device for mounting of claim 1 wherein said pair of members can be of any thickness or size to accommodate a weight of the load imposed.

4. The device for mounting of claim 1 wherein said apertures can be of any appropriate size to accommodate the size of the cable.

* * * * *